United States Patent
Kusunoki

(10) Patent No.: US 8,145,388 B2
(45) Date of Patent: Mar. 27, 2012

(54) AUTOMATIC DRIVING POSITION ADJUSTMENT CONTROL SYSTEM AND METHOD

(75) Inventor: Kiichi Kusunoki, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 768 days.

(21) Appl. No.: 10/581,706

(22) PCT Filed: Nov. 8, 2005

(86) PCT No.: PCT/IB2005/003339
§ 371 (c)(1),
(2), (4) Date: Jun. 5, 2006

(87) PCT Pub. No.: WO2006/051381
PCT Pub. Date: May 18, 2006

(65) Prior Publication Data
US 2007/0119647 A1    May 31, 2007

(30) Foreign Application Priority Data
Nov. 9, 2004   (JP) .................................. 2004-325241

(51) Int. Cl.
*G06F 7/00* (2006.01)
*G06F 17/00* (2006.01)
*G05D 1/00* (2006.01)
*G05D 3/00* (2006.01)
*B60R 22/00* (2006.01)
*E05F 15/00* (2006.01)

(52) U.S. Cl. ........... 701/49; 701/36; 296/64; 296/65.01; 296/65.15

(58) Field of Classification Search .................... 701/36, 701/49, 41; 180/326; 359/850, 877; 307/10.1; 296/63, 64, 65.01, 65.15
See application file for complete search history.

(56) References Cited

U.S. PATENT DOCUMENTS

| | | | | |
|---|---|---|---|---|
| 4,204,255 A * | 5/1980 | Cremer | ............................ | 701/49 |
| 4,707,788 A * | 11/1987 | Tashiro et al. | .................. | 701/49 |
| 4,900,079 A * | 2/1990 | Obara et al. | .................... | 296/64 |
| 5,081,586 A * | 1/1992 | Barthel et al. | .................. | 701/49 |
| 5,670,853 A * | 9/1997 | Bauer | ............................ | 318/286 |
| 5,812,399 A * | 9/1998 | Judic et al. | ....................... | 701/49 |

(Continued)

FOREIGN PATENT DOCUMENTS

DE    94 21 781 U1    10/1996

(Continued)

OTHER PUBLICATIONS

English machine translation of DE 19522897 A1.*

(Continued)

*Primary Examiner* — Jack W Keith
*Assistant Examiner* — Rami Khatib
(74) *Attorney, Agent, or Firm* — Young Basile

(57) ABSTRACT

An automatic driving position adjustment system and its method are disclosed in which a manual adjustment to a first adjustable component results in the automatic adjustment of a second adjustable component. When the position or angle of a seat or other first adjustable component is adjusted by the driver, a detector measures the relative change in position or angle of the first adjustable component. A controller computes the required change in position or angle of the second adjustable component by multiplying a prescribed coefficient by the relative change in position or angle of the first adjustable component.

21 Claims, 7 Drawing Sheets

U.S. PATENT DOCUMENTS

| | | | |
|---|---|---|---|
| 6,064,932 A * | 5/2000 | François | 701/49 |
| 6,282,475 B1 * | 8/2001 | Washington | 701/49 |
| 6,450,530 B1 * | 9/2002 | Frasher et al. | 280/735 |
| 2002/0033297 A1 * | 3/2002 | Ohki et al. | 180/326 |
| 2004/0109247 A1 * | 6/2004 | Wang | 359/877 |
| 2004/0158373 A1 * | 8/2004 | Nakaya | 701/35 |
| 2005/0131609 A1 * | 6/2005 | Noda et al. | 701/49 |

FOREIGN PATENT DOCUMENTS

| | | |
|---|---|---|
| DE | 195 22 897 A1 | 1/1997 |
| JP | 62146745 A * | 6/1987 |
| JP | S62-146745 | 6/1987 |
| JP | 63-122365 | 5/1988 |
| JP | 09-175288 | 7/1997 |
| JP | H10-327963 | 12/1998 |
| JP | H11-255045 | 9/1999 |

OTHER PUBLICATIONS

Human translation of German Patent Document 195 22 897 A1.*
PCT/IB2005/003339 International Search Report and Written Opinion of the International Searching Authority mailed Jun. 14, 2006.

* cited by examiner

AUTOMATIC DRIVING POSITION ADJUSTMENT CONTROL SYSTEM AND METHOD

BACKGROUND

The present invention pertains to automatic position adjustment of adjustable components in a vehicle.

Vehicle interiors include a number of components that may be adjusted for the comfort and safety of the driver, including the seat, steering wheel, rearview mirror, left and right side view mirrors and pedals. When one of these components, such as the seat, is adjusted, it is typically the case that another component, such as a mirror, will also require adjustment. This process has been automated by interlocking the adjustment of various adjustable components. For example, Japanese Kokai Patent Application No. Hei 7[1995]-186792 discloses an automatic driving position adjustment system for vehicles that automatically adjusts the horizontal position of pedals in response to the change in the absolute tilt angle of the steering wheel, measured as the angle from the end of the movable range of the tilt angle of the steering wheel. Because this system provides interlocking adjustment of components by detecting the absolute translational position or absolute angular position of one of the components, it requires additional sensors to detect this absolute position or angle.

SUMMARY OF THE INVENTION

It would be desirable to provide an automatic driving position adjustment system that could operate without detecting the absolute translational or angular position of the adjusted components (such as, for example, the driver's seat or steering wheel) and that would provide a means or automatically adjusting an adjusted component in response to a user-actuated adjustment of another component.

In accordance with one aspect of the invention, an automatic driving position adjustment system is provided for use in a vehicle having at least first and second adjustable components, where the first component is adjustable by an operator between a first and second position. The system includes a movement-distance sensor that generates an output signal indicating the distance that the first adjustable component moves when adjusted by an operator between its first and second positions; a controller responsive to the output signal of the movement-distance sensor and adapted to compute a required distance that the second adjustable component is to move on the basis of the distance moved by the first adjustable component; and a motor that is actuated by the controller and is drivingly engaged to the second adjustable component to move the second component the required distance as computed by the controller.

In accordance with another aspect of the invention, a method is provided for use in a vehicle to automatically adjust the position of a second adjustable component in response to the operator-actuated adjustment of a first adjustable component. The method includes detecting the relative degree of adjustment of the first adjustable component; computing the required degree of adjustment that the second adjustable component is to undergo on the basis of the detected relative degree of adjustment of the first adjustable component; and moving the second adjustable component by the required degree of adjustment.

BRIEF DESCRIPTION OF THE DRAWINGS

The description herein makes reference to the accompanying drawings wherein like reference numerals refer to like parts throughout the several views, and wherein.

DETAILED DESCRIPTION

First Embodiment

Figure 1:
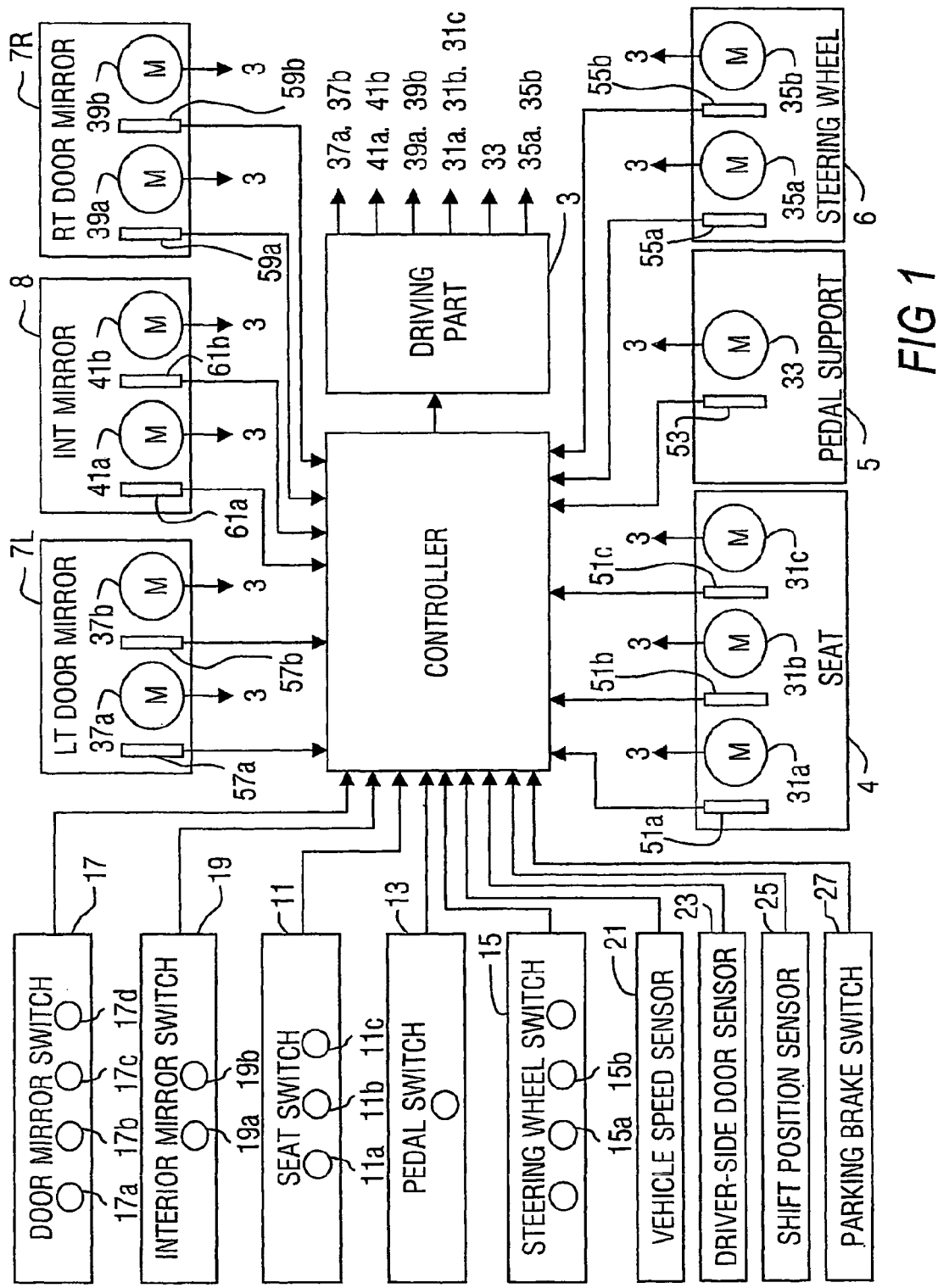
FIG. 1 is a block diagram of an automatic driving position adjustment control system in accordance with a first embodiment of the invention.

FIG. 1 is a block diagram of an automatic driving position adjustment control system in accordance with a first embodiment of the invention, including a controller 1 which is a microcomputer. The adjustable components include seat 4, pedal-supporting part 5, steering wheel 6, left/right door mirrors 7L, 7R, and interior mirror 8. The inputs to controller 1 for controlling the overall operation of the automatic driving position adjustment system are the signals from the following parts: seat switch seat SW 11 for adjusting the position and the reclining angle of driver seat 4, pedal switch pedal SW 13 for adjusting the horizontal positions of the brake pedal and accelerator pedal, steering wheel switch steering wheel SW 15 for adjusting the tilt angle and the telescoping distance of steering wheel 6, door mirror switch door mirror SW 17 for adjusting the left/right angle and up/down angle of the mirror surfaces of left/right door mirrors 7L, 7R, and interior mirror switch interior mirror SW 19 for adjusting the left/right angle and up/down angle of interior mirror 8.

The switch for each the adjustable component has adjustment switches for adjusting each movement direction of the position and angle to be explained below.

Controller 1 sends a signal for controlling the release switch to driving part 3 which is made of a release switch controlling forward/backward rotation of the motor and acts as drive source for driving the adjustable component in each direction of adjustment.

A movement-distance sensor for detecting the amount of movement in each adjustment direction is set for moving the position or angle of the adjustable component, and the signal of the movement distance detected by each movement-distance sensor is input to controller 1.

In the following, an explanation will be given regarding the corresponding relationships among the various types of adjustment switches, motors and movement-distance sensors.

With respect to seat 4, seat switch 11 has slide switch 11a, lifter switch 11b, and reclining switch l1e. The slide switch 11a actuates slide motor 31a to slide seat 4 back/forth. The lifter switch 11b actuates lifter motor 31b to change the height of seat cushion 4a (see FIG. 3). The reclining switch 11c actuates reclining motor 31c to change the angle of seatback 4b (see FIG. 3).

Movement-distance sensor 51a detects the slide movement distance of seat 4. Movement-distance sensor 51b detects the distance that seat 4 is raised. Movement-distance sensor 51c detects the movement distance of the reclining angle of seatback 4b. Movement-distance sensors 51a, 51b and 51c are incorporated into the drive parts of the motors 31a, 31b and 31c, respectively.

Figure 3:
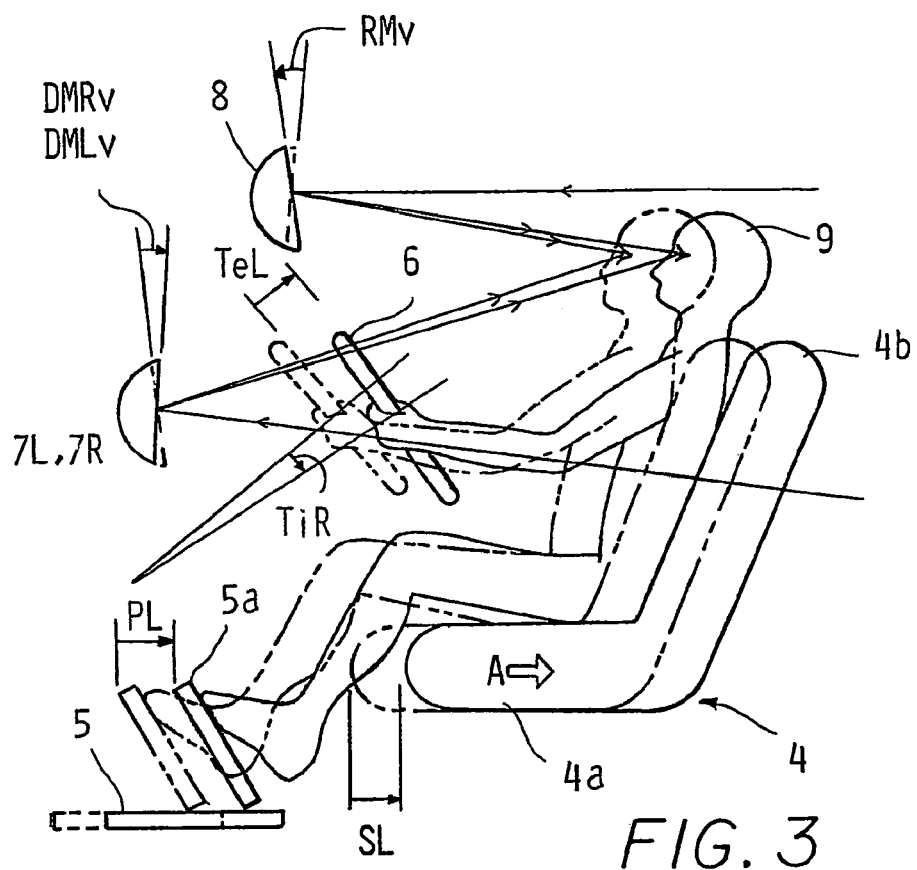
FIG. 3 is a side view of an operator sitting in the driver's seat of a vehicle equipped with the automatic driving position adjustment system shown in FIG. 1, illustrating the interlocked adjustment control when the operator slides the driver's seat toward the rear of the vehicle.

Pedal switch 13 is incorporated into pedal-supporting part 5 that holds the brake pedal, acceleration pedal, and other pedals 5a. Pedal switch 13 actuates pedal horizontal movement motor 33 to move pedals 5a horizontally, as shown in FIG. 3.

The driving portion of pedal horizontal movement motor 33 includes movement-distance sensor 53 that detects the horizontal movement distance of pedal-supporting part 5 due to pedal horizontal movement motor 33.

With respect to steering wheel 6, a steering wheel switch 15 has tilt switch 15a and telescoping switch 15b. The tilt switch 15a actuates tilt motor 35a to change the back-and-forth tilt angle of steering wheel 6. The telescoping switch 15b actuates telescoping motor 35b to extend the steering wheel shaft.

A movement-distance sensor 55a detects the movement distance of the tilt angle and a movement-distance sensor 55b detects the extension distance the steering wheel shaft. Movement-distance sensor 55a and movement-distance sensor 55b are incorporated into the drive parts of the motors 35a and 35b, respectively.

Door mirror switch 17 has left/right switch 17a for left door mirror 7L, up/down switch 17b, left/right switch 17c for right door mirror 7R, and up/down switch 17d.

Left/right switch 17a actuates horizontal motor 37a to change the angle in the left/right direction of the mirror surface of door mirror 7L. Up/down switch 17b actuates up/down motor 37b to change the up/down angle of the mirror surface of door mirror 7L.

Similarly, left/right switch 17c actuates horizontal motor 39a to change the left/right angle of the mirror surface of door mirror 7R. Up/down switch 17d actuates up/down motor 39b to change the up/down angle of the mirror surface of door mirror 7R.

Interior mirror switch 19 has left/right switch 19a and up/down switch 19b. Left/right switch 19a actuates horizontal motor 41a to change the left/right angle of the mirror surface of interior mirror 8. Up/down switch 19b actuates up/down motor 41b to change the up/down angle of the mirror surface of interior mirror 8.

With respect to rotation of the motors, movement-distance sensors 57a, 59a, 61a that detect the movement distance of the left/right angle of the mirror surfaces of the various mirrors are incorporated into the drive parts of the motors for adjusting the left/right direction, and movement-distance sensors 57b, 59b, 61b that detect the movement distances of the up/down angles of the mirror surfaces of the various mirrors are incorporated into the driving portions of the motors for up/down adjustment, respectively.

Controller 1 has signals input to it from the following parts: vehicle speed sensor 21, driver-side door sensor 23 that detects the open/close state of the door on the driver seat side, shift position sensor 25 that detects the shift lever position of the transmission, parking brake switch parking brake SW 27 that detects the state of the parking brake.

When the operator operates the various types of adjusting switches on the basis of the signals from vehicle speed sensor 21, driver-side door sensor 23, shift position sensor 25, and parking brake switch 27, controller 1 determines whether the state is the non-interlocked state that has the motors rotating individually corresponding to individual adjusting switches, or the interlocked state that moves the position or the angle of pedal-supporting part 5, steering wheel 6, left/right door mirrors 7L, 7R, and interior mirror 8 together with the movement distance of the position or the angle of seat 4 by operation of seat switch 11.

In this case of the interlocked state, from the movement distance from the position of the previous adjustment cycle to the position of the current adjustment cycle at the position or angle of seat 4, controller 1 computes the necessary movement distance of the position or angle of the adjustable component interlocked to seat 4, and controls driver 3.

The operation of the embodiment of FIG. 1 is explained by the following example.

In the operation to adjust the position of angle of a first adjustable component of this automatic driving position adjustment system, the adjustment is performed interlocked with the position or angle of one or more of the other adjustable components. Adjustment of the driving position is usually carried out when the driving state is changed for the same driver from the state of having completed adjustment of the driving position, such as a change from highway travel to city street travel where caution is required for safety, or a change of the seating position in different seasons due to, for example, differences in the thickness of the clothes worn by the driver.

In the automatic driving position adjustment system of FIG. 1, the positions or angles of seat 4, pedal-supporting part 5, steering wheel 6, left/right door mirrors 7L, 7R, and interior mirror 8 are initially set appropriately. Then, when the same driver or another driver of the same size readjusts the driving position, adjustment is automatically performed, interlocked with the position or angle of a second adjustable component with respect to the position or angle of the first adjustable component.

Usually, there are many adjustment operations of the driving position, starting with seat 4. Consequently, in the present application example, an example when the first adjustable component is seat 4 will be presented.

Figure 2:
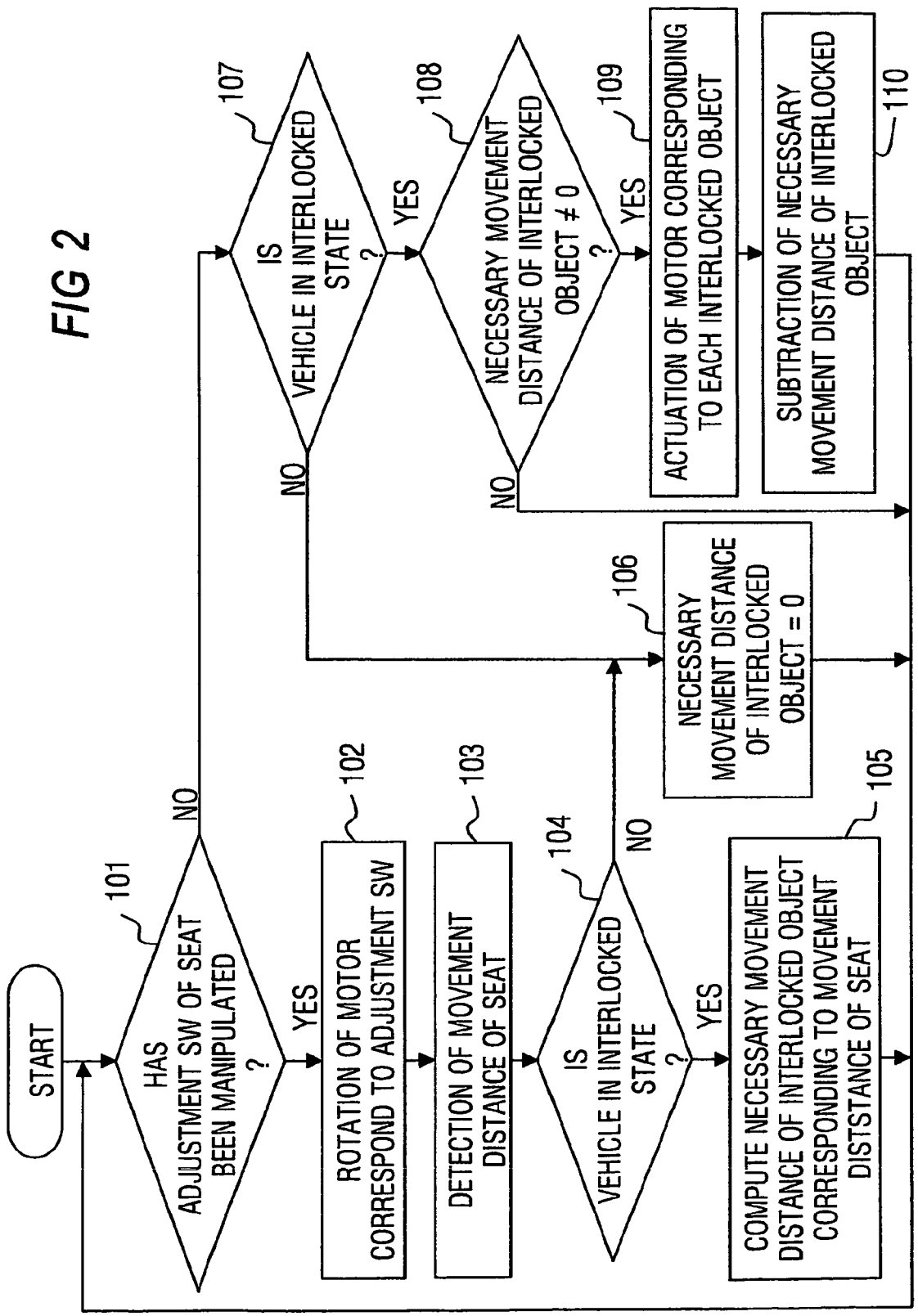
FIG. 2 is a flow chart illustrating the operation of the automatic driving position adjustment control system shown in FIG. 1.

FIG. 2 is a flow chart illustrating the control of movement of the adjustable component by means of the controller that performs interlocked operation.

In step 101, controller 1 checks whether the adjustment switch adjustment SW of seat 4 has been manipulated. If the adjustment switch of seat 4 has been manipulated, it goes to step 102. If the adjustment switch of seat 4 is not manipulated, it goes to step 107.

In step 102, the motor corresponding to the manipulated adjustment switch is driven to rotate.

In step 103, the movement distance of seat 4 in step 102 is detected. In detection of the movement distance, the movement distance is detected for the slide direction, lift direction, and reclining direction of seat 4.

In step 104, whether the vehicle state is in the interlocked state is checked.

The determination of whether or not the vehicle is in the interlocked state is performed such that it is judged as non-interlocked if the vehicle can be moved even when driver-side door sensor 23 shows that the door is open, and it is judged as interlocked if the vehicle cannot be moved when driver-side door sensor 23 shows that the door is open.

The non-moving state of the vehicle is performed as follows: it is considered stopped if at least one of the following conditions is true: zero vehicle speed indicator by vehicle speed sensor 21, detection of the parked or neutral position of shift position sensor 25, or parking brake switch 27 on. If all of the aforementioned conditions are not true, the vehicle is considered to be moving.

From the interlocked state, it goes to step 105, and from the non-interlocked state, it goes to step 106.

In step 105, the necessary movement distance in each adjustment direction is computed for the interlocked adjustable component interlocked object corresponding to the movement distance in each adjustment direction of seat 4.

The necessary movement distance in each adjustment direction in the interlocked state is computed by multiplying a prescribed coefficient by the movement distance detected in each adjustment direction of seat 4 in step 103.

In determining the values of the prescribed coefficients, a human of average physical size may be assumed. After setting the driving position of seat 4, the values of the coefficients are computed and stored in controller 1 for each adjustment direction such that the necessary movement distance in each adjustment direction of the adjustable component interlocked to the movement distance in each adjustment direction of seat 4 is obtained.

Figure 4:
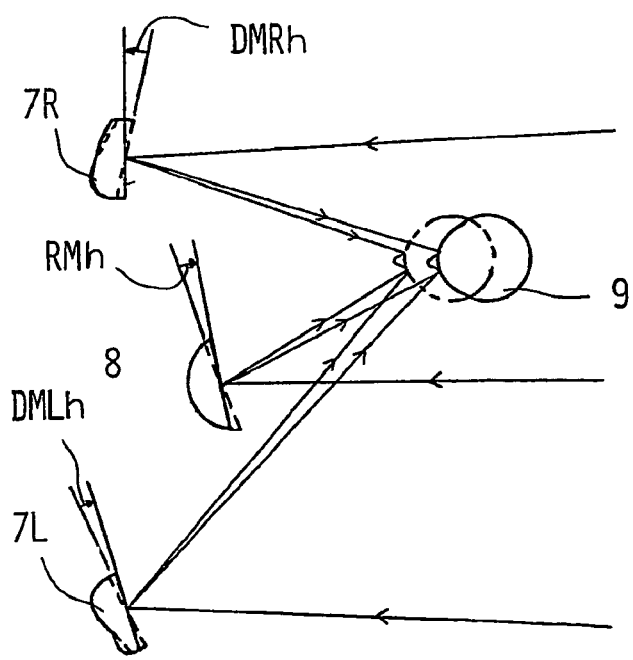
FIG. 4 is a plan view of the operator shown in FIG. 3, illustrating the interlocked adjustment control when the operator slides the driver's seat toward the rear of the vehicle.

For example, in steps 101-105, the driver slides seat 4 a distance SL in the direction indicated by arrow A as shown in FIG. 3. FIG. 4 is a plan view illustrating here the relationship between the movement of the line-of-sight of driver 9 and the angle of each mirror. In FIGS. 3-7, the position of driver 9 before moving is indicated by the broken line, and the position after moving is indicated by the solid line.

With respect to the movement, in order for the image in interior mirror 8 to enter the line-of-sight after moving the seat 4, it is necessary to change the up/down angle by adjustment angle RMv as shown in FIG. 3, and to change the left/right angle by adjustment angle RMh to the right side as shown in FIG. 4.

Similarly, in order for the images of left/right door mirrors 7L, 7R to enter the line-of-sight, it is necessary to change the up/down angle by downward adjustment angles DMLv and DMRv as shown in FIG. 3, and to change the left/right angle by rightward adjustment angle DMLh and leftward adjustment angle DMRh as shown in FIG. 4.

The required distance that the adjustment angle is to be moved is computed by multiplying a prescribed coefficient by seat 4 sliding distance SL.

The necessary movement distance of pedal-supporting part 5 is the distance PL=SL in the rear direction. The necessary movement distance of steering wheel 6 is tilt adjustment angle TiR in the direction to increase the tilt angle, and adjustment distance TeL to extend the telescoping distance, so that the rear side is moved a distance SL, nearly equal to the height of steering wheel 6 before moving. The necessary movement distance is also computed by multiplying a prescribed coefficient by sliding distance SL.

Figure 5:
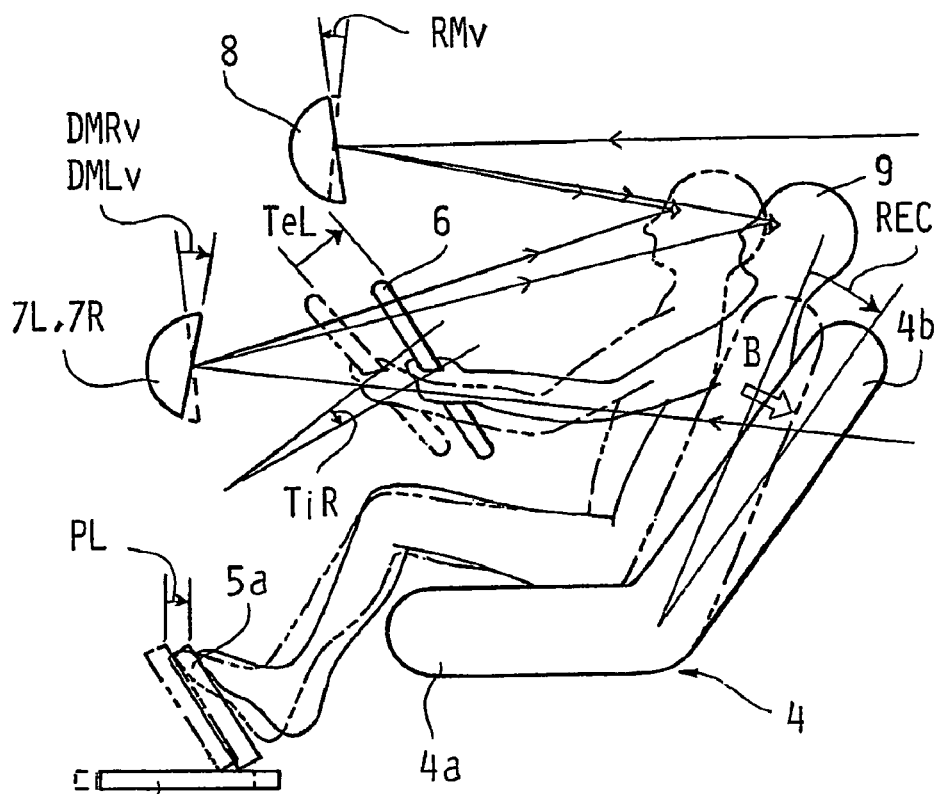
FIG. 5 is side view of an operator sitting in the driver's seat of a vehicle equipped with the automatic driving position adjustment system shown in FIG. 1, illustrating the interlocked adjustment control when the operator's seatback is reclined.
Figure 6:
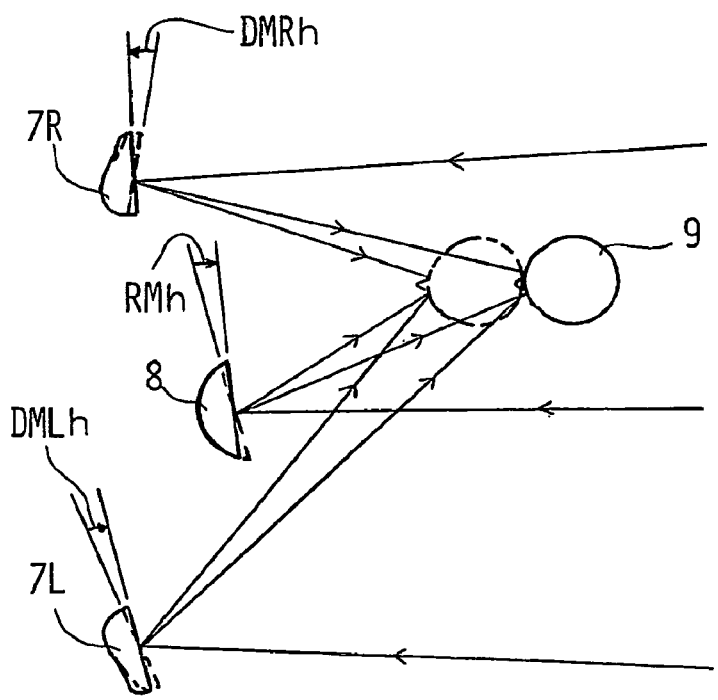
FIG. 6 is a plan view of the operator shown in FIG. 5, illustrating the interlocked adjustment control when the operator's seatback is reclined.

Similarly, consider the case in which the driver reclines seatback 4b by angle REC in the direction indicated by arrow B in steps 101-105 as shown in FIG. 5. FIG. 6 is a plan view illustrating the relationship between the movement of the line-of-sight of driver 9 and the angles of the various mirrors in this case. The position of driver 9 before moving is indicated by the broken line, and the position after moving is indicated by the solid line.

With respect to the movement, in order for the image in interior mirror 8 to enter the line-of-sight after moving, it is necessary to change the up/down angle by adjustment angle RMv as shown in FIG. 5, and to change the left/right angle by adjustment angle RMh to the right side as shown in FIG. 6.

Similarly, in order for the images in left/right door mirrors 7L, 7R to enter the line-of-sight, it is necessary to change the up/down angle by downward adjustment angles DMLv and DMRv as shown in FIG. 5, and to change the left/right angle by rightward adjustment angle DMLh and leftward adjustment angle DMRh as shown in FIG. 6.

The adjustment angle, as the necessary movement distance, is computed by multiplying a prescribed coefficient by adjustment angle REC of seatback 4b as the movement distance.

The necessary movement distance of pedal-supporting part 5 is the distance PL in the rear direction as the legs are raised and the toes go back when seatback 4b is reclined by angle REC. The necessary movement distance PL can be computed by multiplying a prescribed coefficient by angle REC.

The necessary movement distance of steering wheel 6 is tilt adjustment angle TiR in the direction for increasing the tilt angle, and adjustment distance TeL to extend the telescoping distance, so that the reclining angle is increased by angle REC, and the position of the hand is moved backward into the position slightly lower than the height of steering wheel 6 before the movement. This tilt adjustment angle TiR and adjustment distance TeL are also computed by multiplying prescribed coefficients by angle REC.

Figure 7:
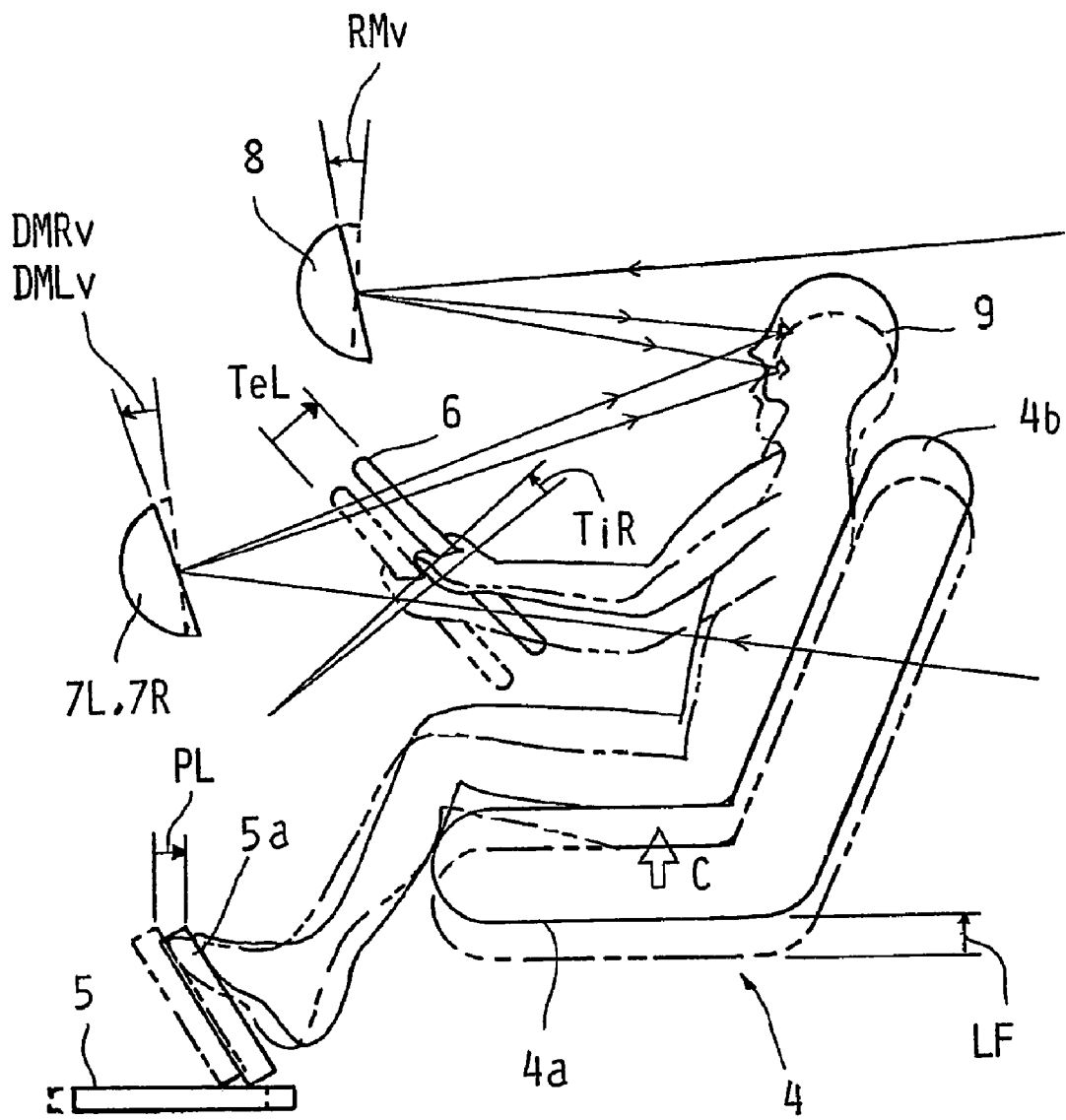
FIG. 7 is a side view of an operator sitting in the driver's seat of a vehicle equipped with the automatic driving position adjustment system shown in FIG. 1, illustrating the interlocked adjustment control when the operator's seat is raised.

Similarly, consider the case in which the driver lifts seat 4 by distance LF in steps 101-105 as shown in FIG. 7. The position of driver 9 before the movement is indicated by the broken line, and the position after the movement is indicated by the solid line.

With respect to the raising movement, in order for the images in left/right door mirrors 7L, 7R and interior mirror 8 to enter the line-of-sight after moving, movement distances DMLv, DMRv, and RMv of the mirrors in the up/down angles are computed by multiplying prescribed coefficients by lift movement distance LF of seat 4.

The necessary movement distance of pedal-supporting part 5 is the distance PL in the rear direction as the legs are raised and the toes go back. The necessary movement distance PL can be computed by multiplying a prescribed coefficient by lift movement distance LF.

The necessary movement distance of steering wheel 6 is tilt adjustment angle TiR in the direction for decreasing the tilt angle, and adjustment distance TeL to extend the telescoping distance, so that steering wheel 6 is raised by lift movement distance LF at the same back/forth position as before the movement. This tilt adjustment angle TiR and adjustment distance TeL are also computed by multiplying prescribed coefficients by lift movement distance LF.

After step 105, control returns to step 101, and as the seat-adjusting switch is manipulated, the operation of steps 101-105 is repeated.

When control goes from step 104 to step 106, the necessary movement distance of the interlocked object is taken as 0, and it returns to step 101.

If at step 101, the seat-adjusting switch has not been manipulated, control moves to step 107, and it is determined whether the vehicle is in the interlocked state. The process of determining the interlocked state is the same as that explained in step 104.

If the vehicle is in an interlocked state, control goes to step 108. If not, control goes to step 106.

If the necessary movement distance is computed during the execution of steps 101-105, and the vehicle state then changes from the interlocked to the non-interlocked state, the necessary movement distance of the interlocked object is reset to 0.

In step 108, whether the necessary movement distance of the interlocked object is ≠0 is checked. If the necessary movement distance is not 0, control goes to step 109. If the necessary movement distance is 0, it returns to step 101.

In step 109, the motor of each of the interlocked objects is driven. That is, the motor is made to rotate to move to the position or angle corresponding to the adjustment direction in each adjustment direction since the necessary movement distance is not 0 for the interlocked objects, that is, pedal-supporting part 5, steering wheel 6, left/right door mirrors 7L, 7R, and interior mirror 8.

In step 110, the movement distance is detected in each adjustment direction for the interlocked object, and it is subtracted from the necessary movement distance computed in step 105. After step 110, control returns to step 101.

After the execution of steps 101-105, in order to move the second adjustable component interlocked in the interlocked state, control goes from step 101 to steps 107-110, and returns to step 101. In this case, in step 108, it is checked whether the necessary movement distance in each adjustment direction for the interlocked object is ≠0 after subtracting the necessary movement distance in step 110.

If the necessary movement distance is not 0, the execution of steps 109 and 110 is repeated, and the motor continues rotating in the adjustment direction the necessary remaining movement distance for the object. For the adjustment direction with the necessary movement distance of 0, rotation of the motor is stopped, and the series of interlocked operations comes to an end.

If the adjustment switch of seat 4 is not manipulated, and the vehicle is in the interlocked state, control goes to steps 101, 107 and 108 and then returns to step 101.

Also, if the vehicle is in the non-interlocked state, it goes to steps 101, 107 and 106 and then returns to step 101.

Also, when the vehicle is stopped, if the driver-side door is open, only the seat is moved by manual adjustment, and the other adjustable components are not interlocked.

In step 103 of the flow chart in the present application example, the movement distance sensors of the present invention operates; in step 101 and steps 104-108, 110, the controller operates; and, in steps 102, 109, the drive motors operates.

As explained above, in the present application example, after the driving position, adjusted for position or angle of seat 4, pedal-supporting part 5, steering wheel 6, left/right door mirrors 7L, 7R and interior mirror 8 corresponding to the driver seat position and attitude have been adjusted, they can be readjusted by the same driver or another driver of the same physical size. For this purpose, since the adjustments are performed manually in the various adjustment directions for seat 4, the adjustment directions of the adjustable components pertaining to another driving position, such as the steering wheel, pedals, left/right door mirrors, and interior mirror, are interlocked and automatically adjusted. Consequently, it is possible to avoid the complicated operation of manually adjusting them individually.

In addition, in the present automatic driving position adjustment system, a prescribed coefficient is multiplied by the movement distances of the back/forth position, height and reclining angle of the seat as the first adjustable component to compute the movement distance of the second adjustable component. Consequently, the system may be operated without detecting the absolute position or absolute angle to set the position or angle of the interlocked second adjustable component.

Consequently, the system of FIG. 1 may be operated without a limit switch to detect the absolute position or absolute angular position in the adjustment directions of the first adjustable component, and it is thus possible to reduce the cost of the automatic driving position adjustment system.

Second Embodiment

In the following, an explanation will be given regarding a second embodiment of the invention. The automatic driving position adjustment system in this second embodiment has the same block diagram illustrating the system of FIG. 1. The same part numbers as those used in first embodiment of the invention are adopted and their explanations will not be repeated.

In this second embodiment, after the driving position has already been adjusted, another driver comes to make manual adjustments of the positions of seat 4, pedals 5a, and steering wheel 6 to fit his/her body. Then, manual adjustments are made for any of the first adjustable components, that is, left/right door mirrors 7L, 7R and interior mirror 8.

Also, the angle of each mirror before the adjustment has been made enables the driver to have the desired rearview image at eye position from the original seat position and attitude of the original driver.

Figure 8A:
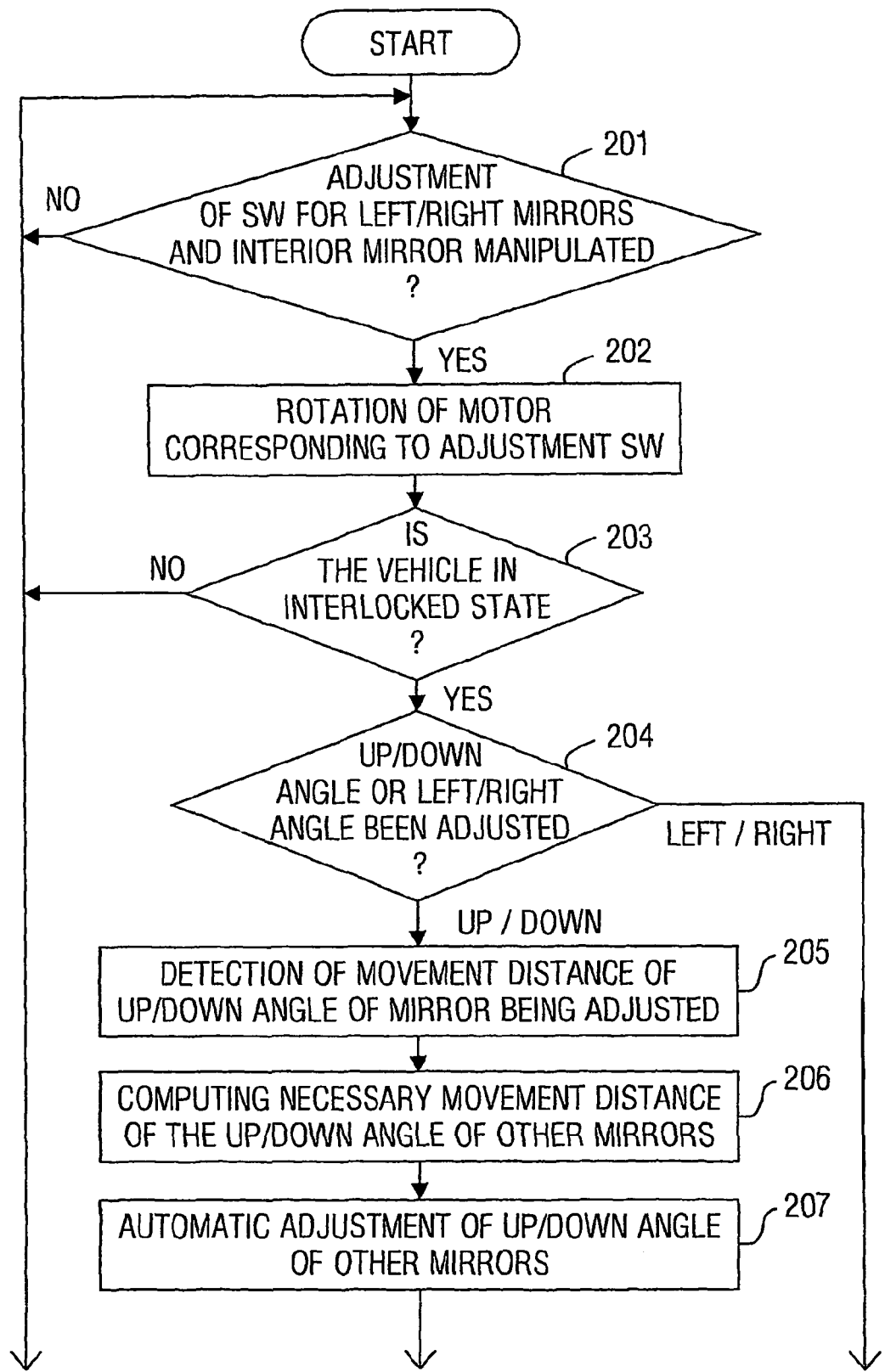
FIG. 8A is a first portion of a flow chart of the operation of the automatic driving position adjustment control system in accordance with a second embodiment of the invention, illustrating the process of the interlocked control when the angles of at least one mirror are moved with the adjustment of the position of another mirror.
Figure 8B:
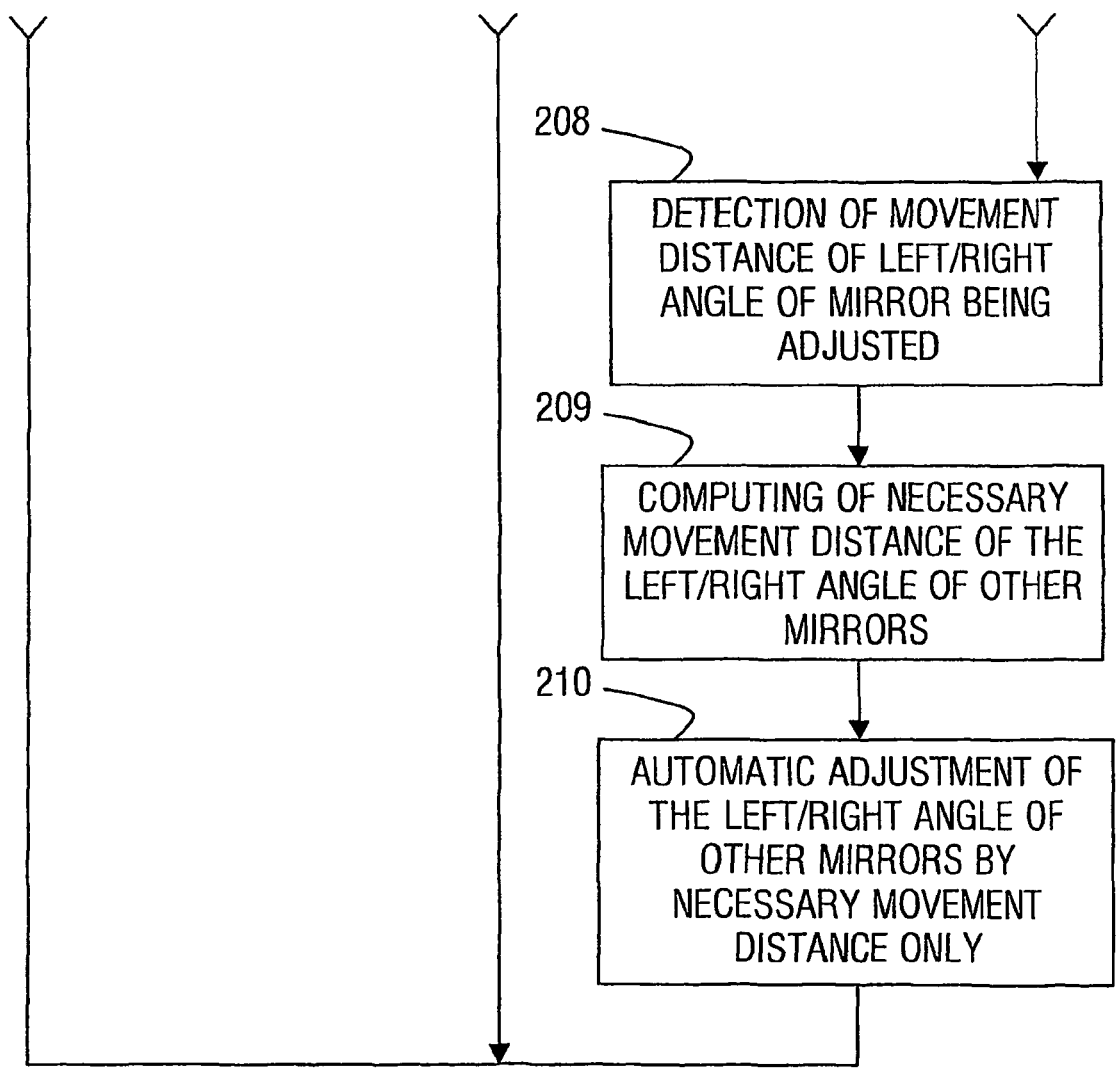
FIG. 8B is a continuation of the flow chart shown in FIG. 8A.

FIG. 8 is a flow chart illustrating process flow for moving the adjustable components as an interlocked operation by the controller, in accordance with the second embodiment of the invention.

In the interlocked state, controller 1 adjusts interlocked adjustment for the angles of the other mirrors when the angle of either left/right door mirrors 7L, 7R or interior mirror 8 is manually adjusted by the driver.

In step 201, controller 1 determines which of the adjustment switches adjustment SW of the left/right door mirrors 7L, 7R or interior mirror 8 has been manipulated. If none have been manipulated, step 201 is executed repeatedly. If one has been manipulated, control goes to step 202.

In step 202, the motor corresponding to the manipulated adjustment switch is turned on to rotate. In this case, by means of left/right switch 17c (up/down switch 17d), the left/right angle the (up/down angle) of right door mirror 7R is adjusted, and horizontal motor 39a (up/down motor 39b) is turned on to rotate.

In step 203, it is checked whether the vehicle is in the interlocked state. The determination process is the same as that pertaining to the explanation of the interlocked state in step 104 as shown in FIG. 2. In the non-interlocked state, control returns to step 201, and the motor for the adjustment direction of the mirror corresponding to the manipulated adjustment switch is turned on. On the other hand, in the interlocked state, control goes to step 204.

In step 204, it is checked whether the adjustment is for the up/down angle or the left/right angle. In the case of adjustment of the up/down angle, control goes to step 205. In the case of adjustment of the left/right angle, it goes to step 208.

In step 205, the movement distance of the up/down angle of the manipulated mirror is detected.

In step 206, the necessary movement distance of the up/down angle of the other mirrors in this example, left door mirror 7L and interior mirror 8 is computed. This necessary movement distance is computed from the relationship between the mounting position of the mirror and the standard line-of-sight by multiplying a prescribed coefficient by the movement distance of the up/down angle of the mirror as the first adjustable component.

In step 207, automatic adjustment is performed for the necessary movement distance computed in step 206. Then, control returns to step 201.

After step 204, if control has gone to step 208, the movement distance of the left/right angle of the adjusted mirror is detected.

In step 209, the necessary movement distance of the left/right angle of the other mirrors in this example, left door mirror TL and interior mirror 8 is computed. This necessary movement distance is computed from the relationship between the mounting position of the mirror and the standard line-of-sight by multiplying a prescribed coefficient by the movement distance of the left/right angle of the mirror as the first adjustable component.

In step 210, automatic adjustment is performed for the necessary movement distance computed in step 209. Then, control returns to step 201.

Also, if the vehicle is stopped and the driver-side door is opened, it is possible to adjust the angular position of only the interior mirror manually, and in such case adjustment of the angular position of the other mirrors would be disabled.

In steps 205 and 208 in the present application example, the movement distance sensor operates. In steps 201, 203, 204, 206, 209, the controller operates. In steps 202, 207, 210, the drive motor operates.

As explained above, according to the present application example, if another, larger or smaller, driver sits in the driver's seat, the adjustable components that have been adjusted to fit the seat position and attitude of the original driver must be manually adjusted and include the adjustment directions of seat 4, pedal-supporting part 5 and steering wheel 6. Then, when left/right door mirrors 7L, 7R and interior mirror 8 are adjusted to suit the eyes, the left/right angle and up/down angle for any of the aforementioned mirrors are manually adjusted, and the left/right angle and up/down angle of the other mirrors are automatically adjusted in an interlocked way. Consequently, it is possible to reduce the manual adjustments to be performed for each mirror.

In addition, in the present automatic driving position adjustment system of the first embodiment, the necessary movement distances of the left/right angle and up/down angle of the other mirrors as the second adjustable component can be computed by multiplying prescribed coefficients by the movement distances of the left/right angle and up/down angle of one of the left/right door mirrors 7L, 7R and interior mirror 8 as the first adjustable component, and the position or angle of the second adjustable component can be set in an interlocked way.

One benefit of the present invention is that the foregoing embodiments do not necessarily require limit switches or the like to detect the absolute angle of the adjustment direction of the first adjustable component. If these switches are eliminated, the automatic driving position adjustment system can be manufactured with less cost.

In the first and second embodiments, determination of the interlocked state or non-interlocked state in controller 1 is performed on the basis of the open/closed state of the driver-side door when the vehicle is stopped. However, the present invention is not limited to this scheme. One may also adopt a scheme in which a non-interlocked/interlocked state switch is set on the console near the driver's seat, and controller 1 makes a judgment on the basis of the state of manipulation of this switch.

Also, in the aforementioned examples, the necessary movement distance in each adjustment direction of the other adjustable component is computed by multiplying a prescribed coefficient by the movement distance in each adjustment direction of the first adjustable component. However, the present invention is not limited to this scheme, that is, the coefficient is not limited to a single preset group. One may also adopt a scheme in which the coefficient corresponding to the magnitude of the movement distance itself can be selected from map data contained in controller 1.

This application is based on Japanese Patent Application No. 2004-325241, filed Nov. 9, 2004 in the Japanese Patent Office, the entire contents of which are hereby incorporated by reference.

Also, the above-mentioned embodiment has been described in order to allow easy understanding of the present invention. The invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An automatic driving position adjustment system for use in a vehicle, comprising:
   (a) a first adjustable component adjustable by an operator, the first adjustable component configured to adjust in a plurality of bi-directions;
   (b) a plurality of additional adjustable components each configured to adjust in a plurality of bi-directions;
   (c) a controller configured to receive vehicle signals and determine at least an interlocked state, wherein the vehicle is not considered to be moving, and a non-interlocked state, wherein the vehicle is considered to be moving, from the vehicle signals;
   (d) a plurality of movement-distance sensors, one movement-distance sensor associated with each bi-direction that the first adjustable component can move, wherein the movement-distance sensors each generates an output signal indicative of a distance and direction moved to achieve a new position of the first adjustable component, wherein the controller, when in the interlocked state, is responsive to the output signal of the movement-distance sensors and is configured to compute a new position of each of the plurality of additional adjustable components on the basis of the distance and direction moved to achieve the new position of the first adjustable component, and based on each new position, calculates the distance and direction each additional adjustable component must move to achieve the new position, and wherein the controller, when in the non-interlocked state, is not responsive to the output signal of the at least one movement-distance sensor; and
   (e) a motor associated with each bi-direction of each adjustable component, wherein the controller actuates each of the motors associated with the additional adjustable components when in the interlocked state, to move the additional adjustable components in the calculated direction the calculated distance to obtain the new positions.

2. The automatic driving position adjustment system of claim 1, wherein the first adjustable component is a driver's seat having three movement-distance sensors, and the additional adjustable components are selected from the group consisting of: a steering wheel having two movement-distance sensors, a right door mirror having two movement-distance sensors, a left door mirror having two movement-distance sensors, and an interior mirror having two movement distance sensors.

3. The automatic driving position adjustment system of claim 1, wherein the controller is further configured to compute the distance and the direction to obtain the desired new position by multiplying a prescribed coefficient by the distance and the direction that the first adjustable component has moved, each prescribed coefficient based on a predetermined relationship between each additional adjustable component and the first adjustable component.

4. The automatic driving position adjustment system of claim 1, wherein the interlocked state occurs when one or more of the vehicle speed is zero, the position of the shift lever is in park, the position of the shift lever is neutral, and the parking brake is on and the non-interlocked state occurs when all of the vehicle speed is not zero, the position of the shift lever is not in park, the position of the shift lever is not in neutral and the parking brake is off.

5. The automatic driving position adjustment system of claim 1, wherein the first adjustable component is a first mirror surface that moves through a range of angular positions when adjusted by an operator; and the additional adjustable components include at least a second mirror surface that is adjustable through a range of angular positions; wherein the movement-distance sensor output is indicative of the change in the angular position of the first mirror surface.

6. A vehicle, comprising the automatic driving position adjustment system of claim 1.

7. The vehicle of claim 6, wherein the first adjustable component is a driver's seat, and the plurality of additional adjustable components are selected from the group consisting of: a steering wheel, a right door mirror, a left door mirror and an interior mirror.

8. The vehicle of claim 6 wherein the controller is further configured to compute the distance and the direction to obtain the desired new position by multiplying a prescribed coefficient by the distance and the direction that the first adjustable component has moved, each prescribed coefficient based on a predetermined relationship between each additional adjustable component and the first adjustable component.

9. The vehicle of claim 6, wherein the interlocked state occurs when one or more of vehicle speed is zero, the position of the shift lever is in park, the position of the shift lever is neutral, and the parking brake is on.

10. The vehicle of claim 6 wherein the first adjustable component is a first mirror surface; wherein the first motor rotates the first mirror through an angular distance; and wherein the movement-distance sensor output is indicative of the angular distance.

11. An automatic driving position adjustment system for use in a vehicle, comprising:
    (a) a first adjustable component wherein the first component relates to the attitude of a driver and is movable by the driver in a plurality of bi-directions during a series of adjustment cycles;
    (b) a plurality of additional adjustable components each configured to move in a plurality of adjustment bi-directions;
    (c) movement-distance detecting means for detecting each distance and direction of the plurality of bi-directions that the first adjustable component is moved from its position during the previous adjustment cycle to its position in the current adjustment cycle;
    (d) control means for determining an interlocked state wherein the vehicle is not considered to be moving and a non-interlocked state wherein the vehicle is considered to be moving and, when in the interlocked state, computing a new position for each of the plurality of additional adjustable components on the basis of each distance and direction moved by the first adjustable component as detected by the movement distance detecting means and computing each direction and distance necessary to move each additional adjustable components to obtain the new position; and
    (e) drive means for moving the plurality of additional adjustable components the directions and associated distances to obtain the new position as computed by the control means.

12. The automatic driving position adjustment system of claim 11, wherein the first adjustable component is a driver's seat, and the additional adjustable components are selected from the group consisting of: a steering wheel, a right door mirror, a left door mirror and an interior mirror.

13. The automatic driving position adjustment system of claim 11, wherein the control means computes each distance and direction to move each additional adjustment component by multiplying a prescribed coefficient by the distance and direction moved by the first adjustable component as detected by the movement distance detecting means, each prescribed coefficient based on a predetermined relationship between each additional adjustable component and the first adjustable component.

14. The automatic driving position adjustment system of claim 11, wherein the interlocked state is selected when one or more of vehicle speed is zero, the position of the shift lever is in park, the position of the shift lever is in neutral, and the parking brake is on.

15. The automatic driving position adjustment system of claim 11, wherein the first adjustable component is a first mirror surface adjustable about an angle and one of the additional adjustable components is a second mirror surface, wherein the movement-distance detecting means detects the angle that the first mirror is rotated.

16. A method for use in a vehicle to automatically adjust the position of a plurality of additional adjustable components in a plurality of adjustment bi-directions in response to the operator-actuated adjustment of a first adjustable component, comprising:
    (a) detecting each direction and an associated distance of operator-actuated adjustment for each of the plurality of bi-directions to achieve a new position of the first adjustable component;
    (b) determining an interlocked state wherein the vehicle is not considered to be moving or a non-interlocked state wherein the vehicle is considered to be moving;
    (c) when the interlocked state is determined, computing a new position of each additional adjustable component corresponding to the new position of the first adjustable component, each new position requiring directions and associated distances of adjustment for each of the plurality of bi-directions that the plurality of additional adjustable components are to undergo on the basis of the detected adjustment of the first adjustable component; and
    (d) moving the additional adjustable components each direction and associated distance of adjustment required to obtain its new position.

17. The method of claim 16, wherein the first adjustable component is a driver's seat, and the detected direction and associated distance of adjustment is measured as the direction and distance traveled by the seat in a first bi-direction, the direction and distance traveled by the seat in a second bi-direction, and the direction and distance traveled by the seat back.

18. The method of claim 16, wherein the first adjustable component is a mirror surface that is adjustable by rotation, and the detected direction and associated distance of adjustment is measured as an angle through which the mirror is rotated.

19. The method of claim 16, wherein the additional adjustable components are selected from the group consisting of: a steering wheel, a right door mirror, a left door mirror and an interior mirror.

20. The method of claim 16, wherein the step of computing the directions and associated distances of adjustment further comprises multiplying a prescribed coefficient by each detected direction and associated distance of adjustment of the first adjustable component.

21. The method of claim 16, wherein the interlocked state is determined when one or more the vehicle speed is zero, the position of the shift lever is in park, the position of the shift lever is in neutral, and the parking brake is functional.

* * * * *